United States Patent [19]
Stoller
[11] 3,723,970
[45] Mar. 27, 1973

[54] OPTICAL CHARACTER RECOGNITION SYSTEM

[75] Inventor: Milton Stoller, West Hartford, Conn.
[73] Assignee: Scan-Optics, Inc., East Hartford, Conn.

[22] Filed: Jan. 4, 1971
[21] Appl. No.: 103,646

[52] U.S. Cl. ....... 340/146.3 MA, 340/146.3 AG, 340/146.3 H, 356/71
[51] Int. Cl. ....... G06k 9/12
[58] Field of Search ....... 340/146.3 MA, 146.3 AC, 340/146.3 AG, 146.3 F, 146.3 H, 146.3 R; 356/71

[56] References Cited

UNITED STATES PATENTS

| | | | |
|---|---|---|---|
| 3,522,586 | 8/1970 | Kazuo Kiji et al. | 340/146.3 MA |
| 3,613,080 | 10/1971 | Angeloni et al. | 340/146.3 AC |
| 3,582,884 | 6/1971 | Shepard | 340/146.3 H |
| 3,178,687 | 4/1965 | Perotto | 340/146.3 AC |
| 3,379,826 | 4/1968 | Gray | 340/146.3 AG |

OTHER PUBLICATIONS

ETT, IBM Technical Disclosure Bulletin, "Image Reversal Dissector," Vol. 12, No. 9, Feb. 1970. P. 1345.

*Primary Examiner*—Maynard R. Wilbur
*Assistant Examiner*—Leo H. Boudreau
*Attorney*—Brumbaugh, Graves, Donohue & Raymond

[57] ABSTRACT

As described herein, a program controlled image dissector tube scans the printed information recorded on a storage medium to provide analog information signals. The analog signals are converted into digital data signals representative of the segmental brightness of the scanned storage medium and thereafter accumulated in an image enhancement network. In the image enhancement network, selected arrays of the signals are scanned to develop directional and threshold digital data bits representative of the character information contained in each of the arrays. These digital data bits are, in turn, accumulated to provide arrays of the digital data bits representative of entire characters. The presence or absence of selected digital data bits in each of the arrays is then detected and the detected digital data bits combined to provide a character representative signal.

19 Claims, 10 Drawing Figures

INVENTOR.
MILTON STOLLER
BY Brumbaugh, Graves, Donohue & Raymond
his ATTORNEYS

INVENTOR.
MILTON STOLLER
BY Brumbaugh, Graves, Donohue & Raymond
his ATTORNEYS

INVENTOR.
MILTON STOLLER
BY Brumbaugh, Graves, Donohue & Raymond
his ATTORNEYS

INVENTOR.
MILTON STOLLER
BY Brumbaugh, Graves, Donohue & Raymond
his ATTORNEYS

INVENTOR.
MILTON STOLLER
BY Brumbaugh, Graves, Donohue & Raymond
his ATTORNEYS

INVENTOR.
MILTON STOLLER
BY Brumbaugh, Graves, Donohue & Raymond
his ATTORNEYS

OPTICAL CHARACTER RECOGNITION SYSTEM

BACKGROUND OF THE INVENTION

This invention relates to character recognition apparatus for converting recorded character information into a form directly suitable for electronic data processing and, more particularly, to an optical character recognition apparatus wherein the character information is sensed optically and thereafter converted to a form directly suitable for electronic data processing.

In optical character recognition systems, hereinafter referred to as "OCR" systems, the imperfect nature of the date entering the system precludes the always accurate conversion of the data into a form suitable for electronic data processing. Printed characters generated by a typewriter or printing machine may have a variety of defects such as broken lines, gray areas where the characters should be, white, and poorly registered characters. An important aspect of the performance of any recognition system is measured by the number of inaccurate identifications (substitutional errors) and the number of rejected characters (reject errors). For an OCR system to have utility and be economically worthwhile, it is clear that the system must make a minimum of both substitutional and reject errors.

The technologies used in OCR systems include optical, electronic, mechanical and computer techniques. Generally, the presently devised technologies favor a maximum amount of electronic processing and only a a minimal amount of optical processing. In addition, the presently devised technologies discriminate between the recognition of characters recorded on documents and the recognition of characters recorded on pages. Document readers are characterized by continuous scanning techniques, whereas page readers are characterized by intermittent scanning techniques.

Most systems scan the document or page, as the case may be, and discriminate between the printed characters and the nominal blank background. Mechanical scanners, segmented photosensitive surfaces and flying spot scanners are presently used to scan the characters, and the ultimate performance of the system depends on the discrimination by the optical system of the black marks against the white background of the paper. A control unit is often used with a cathode ray tube flying spot scanner to provide a raster scanning pattern which has been optimized for optimum character recognition.

In all OCR systems, some form of data reduction must be implemented to perform successfully character recognition. The key geometrical features indicative of the character shape must somehow be extracted, reducing the redundancy of the pattern before a compact representation of the character can be generated. A sequential series of bits may represent the character, or the scanner may use a number of detectors in parallel to scan the character, or several hundred detectors may be used in parallel to segment the character. To identify the character, a variety of logic schemes have been proposed including, *inter alia*, fixed threshold decisions of the weighted output of black points in the character field, adaptive elements for variable threshold networks and other schemes involving conventional computer circuitry. Because of the indeterminacy of this problem and the fact that no unique solution has yet proven to exist, each type of system presently available uses substantially different recognition logic.

SUMMARY OF THE INVENTION

It is therefore an object of the present invention to provide optical character recognition apparatus which converts character information into a form directly suitable for electronic data processing with a minimum of both substitutional and reject errors.

It is also an object of the present invention to provide an optical character recognition system that may be used to convert character information recorded on either a page or a document into a form directly suitable for electronic data processing.

These and other objects of the present invention are accomplished by applicant's system which includes a program controlled scanning device which scans the information recorded on a storage medium to provide information signals representative of the brightness of the storage medium. The analog signals are converted into digital data signals representative of the segmental brightness of the scanned storage medium and thereafter accumulated in an enhancement circuit means. In the enhancement circuit means, selected arrays of the accumulated signals are scanned to develop directional and threshold digital data bits representative of the character information contained in each of the arrays. In turn, the directional and threshold digital data bits are accumulated in selected patterns which contain sufficient information to identify entire characters. The presence or absence of selected directional and threshold digital data bits in each of the patterns is then detected and the detected signals combined to provide a character representative signal.

DESCRIPTION OF THE PREFERRED EMBODIMENT

Figure 1:
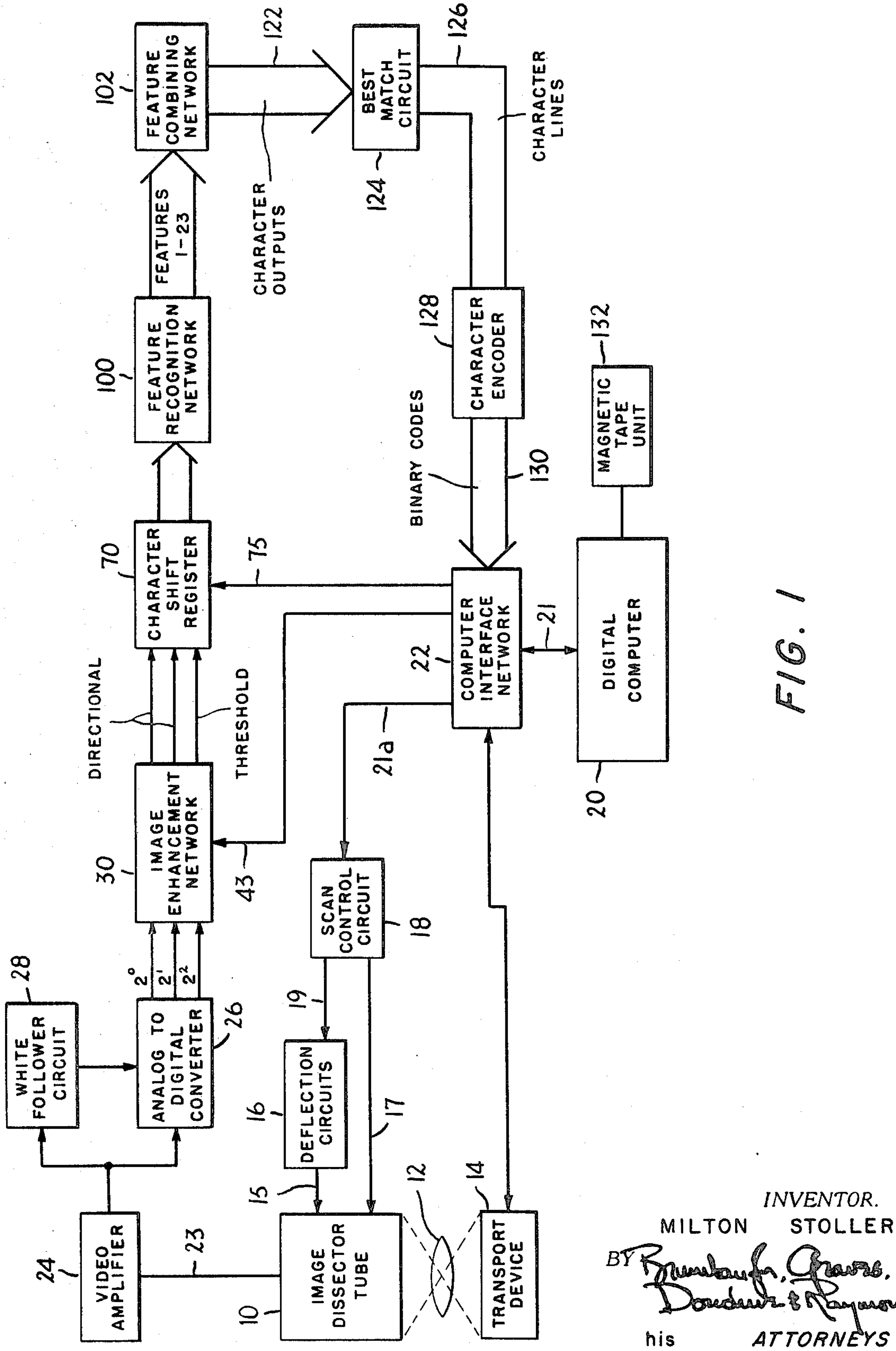
FIG. 1 is a schematic block diagram of a typical optical character recognition system arranged according to the present invention.

In the schematic block diagram of an optical character recognition system arranged according to the present invention, as shown in FIG. 1, a camera tube 10, which preferably comprises, an image dissector scans through a projection lens 12 the printed information (characters) recorded on a page which is carried into alignment with the scanning area of the image dissector 10 by a transport device 14.

Under the control of sweep deflection voltage signals supplied to the image dissector 10 over a cable 15 by a deflection circuit 16, which may be of conventional construction, and under the control of the appropriate blanking signals supplied to the image dissector 10 over a cable 17 by a scan control circuit 18, which also may be of conventional construction, the image dissector 10 scans a predetermined area on the transport device 14 in a line-by-line pattern. In a system that has been operated successfully, the entire photoelectric image of a nine inch by nine inch area in the transport device is periodically dissected by the aperture of the image dissector 10. As will be understood, in addition to supplying the blanking signals to the image dissector 10, the scan control circuit 18 supplies the appropriate V-drive and H-drive signals to the deflection circuit 16 over the cable 19 to enable the circuits included therein to produce the appropriate horizontal and vertical deflection voltage signals. The frequency and area of the photoelectric image dissected by the aperture of the dissector 10 are controlled in accordance with a predetermined program incorporated into a digital computer 20. The computer 20, which may be pre-programmed, generates the appropriate drive and blanking signals and supplies such signals to a computer interface network 22 with which it is in two-way communication through a cable 21.

The interface network couples the appropriate drive and blanking signals to the scan control circuit 18 by way of a cable 21*a*. In addition, the network 22 is in two-way communication with the transport device 14 by means of a cable 21*b*. This interconnection between the network 22 and the transport device 14 enables the computer 20 to control the operation of the transport device and maintain synchronism between the operation of the device 14 and the periodic sampling of the photoelectric image of the character storage medium by the dissector 10. For example, a line on the page being sampled by the image dissector tube 10 may be sampled two or more times under program control to insure the accurate recognition of the characters recorded on the scanned page, while at the same time the device 14 is enjoined from advancing such page outside the scanning area of the image dissector 10.

As understood in the art, the analog information signals derived by the image dissector 10 have maximum amplitudes where the scanned area is white and minimum amplitudes where the scanned area is black. The analog signals, representative of the brightness in the sampled page, are supplied by way of cable 23 and a conventional video amplifier 24 to the input terminals of an analog-to-digital converter 26 and to a white follower circuit 28. In the analog-to-digital converter 26, the information signals are converted into 3 bits of digital information identified at the output terminals of the converter as $2^0$, $2^1$ and $2^2$. As will be understood in the art, the converter 26 produces a binary sum signal of 7 viz., 111 in response to a maximum brightness signal supplied thereto, produces a binary signal of zero, viz., 000, in response to a completely black signal supplied thereto and produces a binary sum signal of three, viz., 011, for example, when a gray signal is developed by the dissector 10. The white follower circuit 28 responds to the analog information signals to supply a control signal to the converter 26 which enables the converter to produce a uniform digital signal (0–7) despite changes in the reflective nature of the paper, the non-uniform illumination of the paper and the like. In this way, the shades of gray in the input analog signal are normalized whereby the digital output signal from the converter 26 will represent accurately the segmental brightness in the scanned paper.

Figure 2:
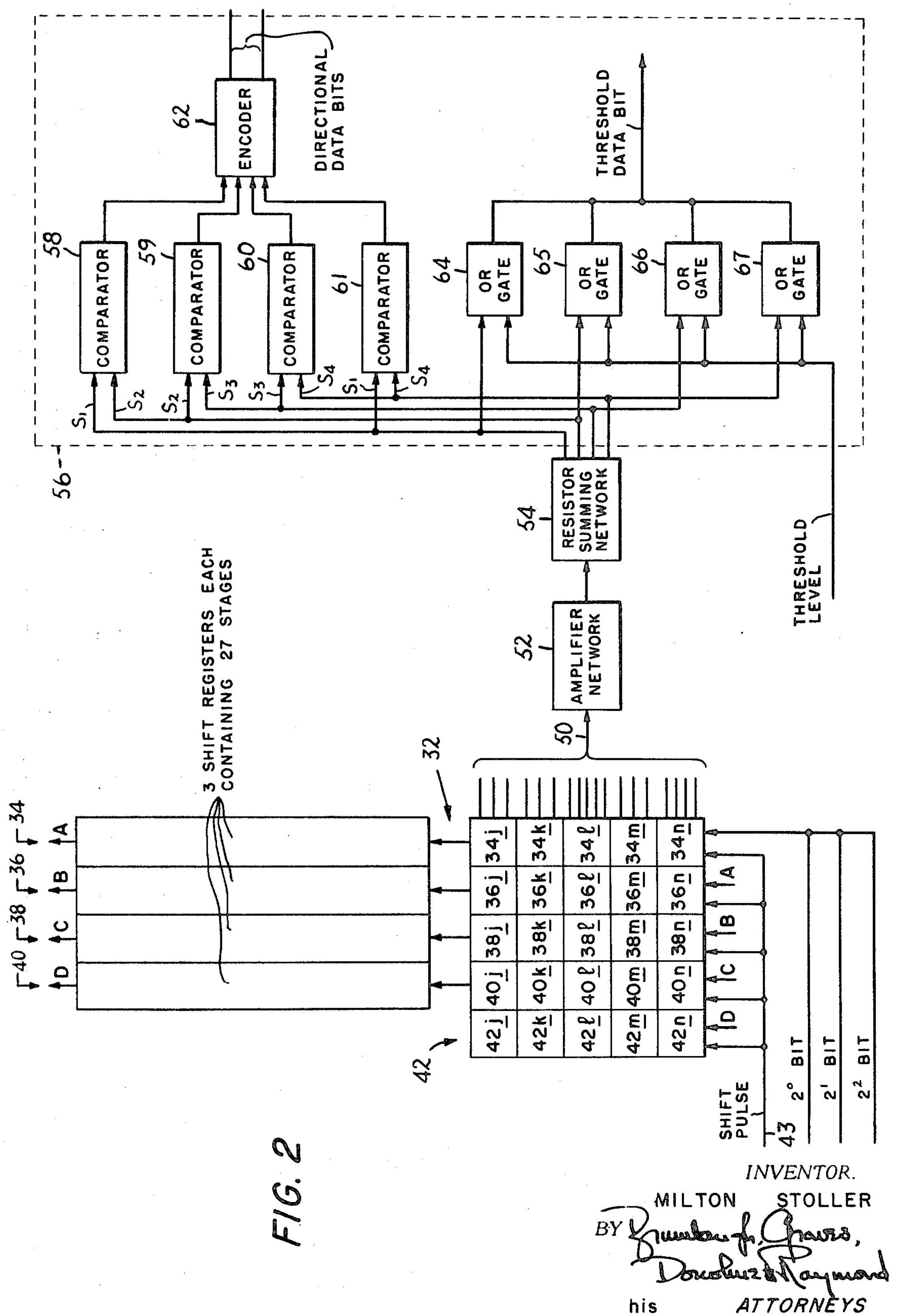
FIG. 2 is a schematic block diagram of a typical image enhancement network included within the system of FIG. 1.

From the analog-to-digital converter 26, the digital data signals $2^0$, $2^1$ and $2^2$ representative of the segmental brightness of the scanned paper are supplied to an image enhancement network 30. Referring now to FIG. 2, there is shown a schematic block diagram of one embodiment of an image enhancement network for use in the instant invention. The network includes a storage register 32 for sequentially storing the digital data bits $2^0$, $2^1$, $2^2$ corresponding to the incremental brightness information in the scanned paper. To this end, the register comprises four shift register columns (in plan) 34, 36 and 38 and 40, each of which includes three (3) 32 bit shift registers arranged in superposed relation and a fifth shift register column 42 having three (3) 5 bit shift registers arranged in superposed relation. A shift pulse having a frequency of one (1) megaHertz (mHz) for example, is supplied from the computer interface network 21 (FIG. 1) along a conductor 43 to the shift input terminals of the registers in each of the columns 34, 36, 38, 40 and 42, as shown.

It will be noted that the digital brightness information bits $2^0$, $2^1$ and $2^2$ are supplied separately along the labelled conductors from the converter 26 (FIG. 1) to the first flip-flop in each of the three registers composing the shift register column 34. The data bits are shifted through the registers in the direction indicated by the arrows A, B, C and D. Thus, in each of the register columns 34, 36 38 and 40 a total of 96 (3 × 32) different digital brightness bits will be accumulated each 32 microseconds. The data is shifted sequentially through the register columns 34, 36, 38 and 40, in that order, with the last or uppermost flip-flops in the three registers composing each register column being tied to the first or lowest flip-flops in the three registers composing the next shift register column, as indicated by the arrows A, B and C. In the register column 42, a total of 15 (3 × 5) different digital brightness bits will be accumulated each microsecond. The digital information is shifted from the register column 40 to the register column 42 as indicated by the arrow D.

Figure 3:
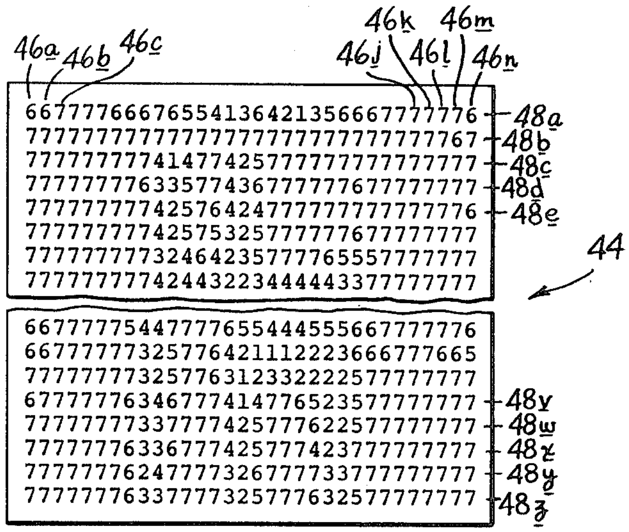
FIG. 3 illustrates a numerical printout of the digital data representative of the brightness in a storage medium scanned by the image dissector tube of the FIG. 1 system.

A numerical printout 44 of the brightness of a scanned image area (paper) represented in digital data form is shown in FIG. 3. The printout includes 32 columns 46*a*–46*n* and 60 rows 48*a*–48*z* of digital information which depict in digital binary form the brightness of the scanned image area. The rows 48*a*–48 of the printout correspond to register columns 34, 36, 38, 40 and 42 (FIG. 2). While it would be possible to decode all the digital data represented by the printout 44 shown in FIG. 3, in order to develop character recognition information, the applicant, through the storage register 32, serially scans and decodes selected arrays of the derived digital brightness information in the manner described below.

Referring to both FIGS. 2 and 3, it will be seen that during a period of one microsecond, register columns 34, 36, 38 and 40 will contain the binary digital brightness information corresponding to the binary digital brightness indicated in the rows **48*a*–48*d*, of the printout respectively, and register column 42 will contain the digital brightness information corresponding to the digital brightness in row 48*e*, columns 46*j*–46*n* of the printout. Specifically, the first or lowest five flip-flops in each of the three registers composing the columns 34, 36, 38 and 40, identified separately (in threes) as flip-flop trios 34*j*–34*n*, 36*j*–36*n*, 38*j*–38*n* and 40*j*–40 correspond to and contain the digital information illustrated in rows 48*a*–48*d*, columns 46*j*–46× trios 42*j*–42 in the register column 42 correspond to row 48*e*, columns 46*j*–46*n*. As should be apparent, the flip-flop trios 34*j*–34*n*, 36*j*–36*n*, 38*j*–38*n*, 40*j*–40*n* and 42*j*–42** constitute a 5 × 5 × 3 flip-flop matrix or array.

According to the present invention, the information contained by the flip-flop trios **34*j*–34*n*, 36*j*–36*n*, 38*j*–38*n*, 40*j*–40*n* and 42*j*–42*n* is selectively sampled every microsecond to obtain character recognition information. As an illustrative example, it will be seen that in the microsecond immediately preceding the shifting of the new data bits (110═b) into the flip-flop trio 34*n*, row 48*a*, column 46*n*** in the printout the bit configuration of the flip-flop trios would have been as follows:

| 42 | 40 | 38 | 36 | 34 | |
|---|---|---|---|---|---|
| 7 | 7 | 7 | 7 | 7 | Row 46*j* |
| 7 | 7 | 7 | 7 | 7 | Row 46*k* |
| 7 | 7 | 7 | 7 | 7 | Row 46*l* |
| 7 | 7 | 7 | 7 | 7 | Row 46*m* |
| 7 | 7 | 7 | 6 | 7 | Row 46*n* |
| 48*e* | 48*d* | 48*c* | 48*g* | 48*a* | |

With the shifting of the new data bits (110) into the flip-flop trio **34*n***, the configuration of the flip-flop trios is as shown in FIG. 3, to wit:

| 42 | 40 | 38 | 36 | 34 | |
|---|---|---|---|---|---|
| 7 | 7 | 7 | 7 | 7 | (46*j*) |
| 7 | 7 | 7 | 7 | 7 | (46*k*) |
| 7 | 7 | 7 | 7 | 7 | (46*l*) |
| 7 | 7 | 7 | 6 | 7 | (46*m*) |
| 6 | 7 | 7 | 7 | 6 | (46*n*) |
| 48*e* | 48*d* | 48*c* | 48*h* | 48*a* | |

All the flip-flop trios **34*j*–34*n*, 36*j*–36*n*, 38*j*–38*n*, 40*j*–40and 42*j*–42*n*, comprising the 5 × 5 × 3 flip-flop matrix are now, however, sampled every microsecond. Rather, the middle flip-flop trio 38*l* is used as a reference and only those flip-flop trios extending in a North-South direction (flip-flop trios 38*j*, 38*k*, 38*l*, 38*m*, 38*n*) those flip-flop trios extending in an East-West direction (flip-flop trios 34*l*, 36*l*, 38*l*, 40*l* and 42*l*) those flip-flop trios extending diagonally North-East to South-West (flip-flop trios 34*j*, 36*k*, 38*l*, 40*m*, 42*n*) and those flip-flop trios extending diagonally from South-East to North-West (flip-flop trios 34*n*, 36*m* 38*l*, 40*k* and 42*j*) are sampled. In this manner, directionality and magnitudinal information are derived through the utilization of a minimum number of hardware components. Furthermore, referring again to FIG. 3, because the middle flip-flop trio in the 5 × 5 × 3 matrix is employed as a reference, only 28 microseconds out of a possible 32 microseconds are required to scan five rows 48*a*–48*e* and 32 columns 46*a*–46*n*** of information.

The set or "1" sides of the flip-flop trios extending in the four above-identified directions are coupled by way of a cable 50 to an amplifier network 52 comprising, for example, fifty-one (51) amplifiers. Only 51 amplifiers are required insofar as the only 17 flip-flop trios **34*j*, 34*l*, 34*n*, 36*k*, 36*l*, 36*m*, 38*j*, 38*k*, 38*l*, 38*m*, 38*n*, 40*k*, 40*l*, 40*n*, 42*j*, 42*l* and 42*n* out of a possible 25** flip-flop trios are employed to detect the directional and magnitudinal brightness information in the digital data signals every microsecond.

The digital signals supplied by the aforementioned flip-flop trios are amplified and then supplied to a resistor summing network 54 wherein the outputs from the flip-flop trios extending vertically, horizontally and diagonally are separately added to provide analog sum signals $S_1$, $S_2$, $S_3$ and $S_4$ representative of the magnitudes of the brightness digital data bits in the four directions, viz. flip-flop trios **38*j*, 38*k*, 38*l*, 38*m*, 38*n*; 34*l*, 36*l*, 38*l*, 40*l*, 42*l*; 34*j*, 36*l*, 38*l*, 40*n*, 42*n*; and 34*n*, 36*m*, 38*l*, 40*k*, 42*j***; respectively. As will be understood, resistor networks of the foregoing type are of conventional construction and need not be described in detail herein. Four different sum signals are generated each microsecond as the contents of the 5 × 5 × 3 flip-flop matrix in the register 32 are changed.

From the network 54, the four analog sum signals are carried separately to a magnitude and directional comparator circuit 56. As shown, the circuit 56 includes four comparators 58, 59, 60 and 61, which may be of conventional construction, to which the sum signals $S_1$, $S_2$, $S_3$ and $S_4$ are selectively applied as shown. In the comparators 58–61, the signals $S_1$ $S_2$; $S_2$ $S_3$; $S_3$ $S_4$; and $S_1$ $S_4$ respectively are compared and, depending upon the magnitudes of the respective sum signals supplied to their input terminals, supply either negative or positive signals to an encoder circuit 62. The comparators 58–61 may be constructed, for example, to supply positive signals when the sum signals supplied to the upper input terminals thereof are greater than the sum signals supplied to the lower input terminals thereof and to supply negative signals when the sum signals, supplied to the upper input terminals are less than the sum signals supplied to the lower input terminals.

The encoder 62, which may be of conventional construction and comprising, for example, a plurality of AND gates arranged to encode the comparison signals supplied thereto, detects the sum signal having the smallest magnitude. Depending upon which sum signal has the smallest magnitude, the encoder 62 generates a two digit binary signal representative of such sum signal, and supplies the signals to a pair of output conductor labelled "directional data bit." Specifically, the digital output 00 is generated when sum signal $S_1$ has the smallest magnitude, the digital output 01 corresponds to the signal $S_2$, the digital output 10 corresponds to the sum signal $S_3$ and the digital output 11 corresponds to the detection of the sum signal $S_4$ as having the smallest magnitude. As will be apparent, the two digit binary output signals generated by the encoder circuit 62 may be characterized as directional data bits.

The sum signals $S_1$, $S_2$, $S_3$ and $S_4$ are also supplied to the input terminals of four OR gates 64, 65, 66 and 67, respectively, within the comparator circuit 56. The other input terminals of the OR gates 64–67 are tied together and have supplied thereto a threshold voltage signal which has an amplitude (low) corresponding to the detection of a black mark on a scanned page. Each of the OR gates 64–67 is arranged such that when the sum signal supplied to the other input terminals thereof has a magnitude less than the magnitude of the threshold level, the OR gate is enabled. The output terminals of the OR gates 64–67 are coupled together such that the detection of a sum signal having an amplitude less than the amplitude of the predetermined threshold level voltage signal will result in the generation of a so-called threshold signal. Such threshold signal is represented by the digital data bit "1" and is supplied to an output conductor labelled "threshold data bit."

Figure 4:
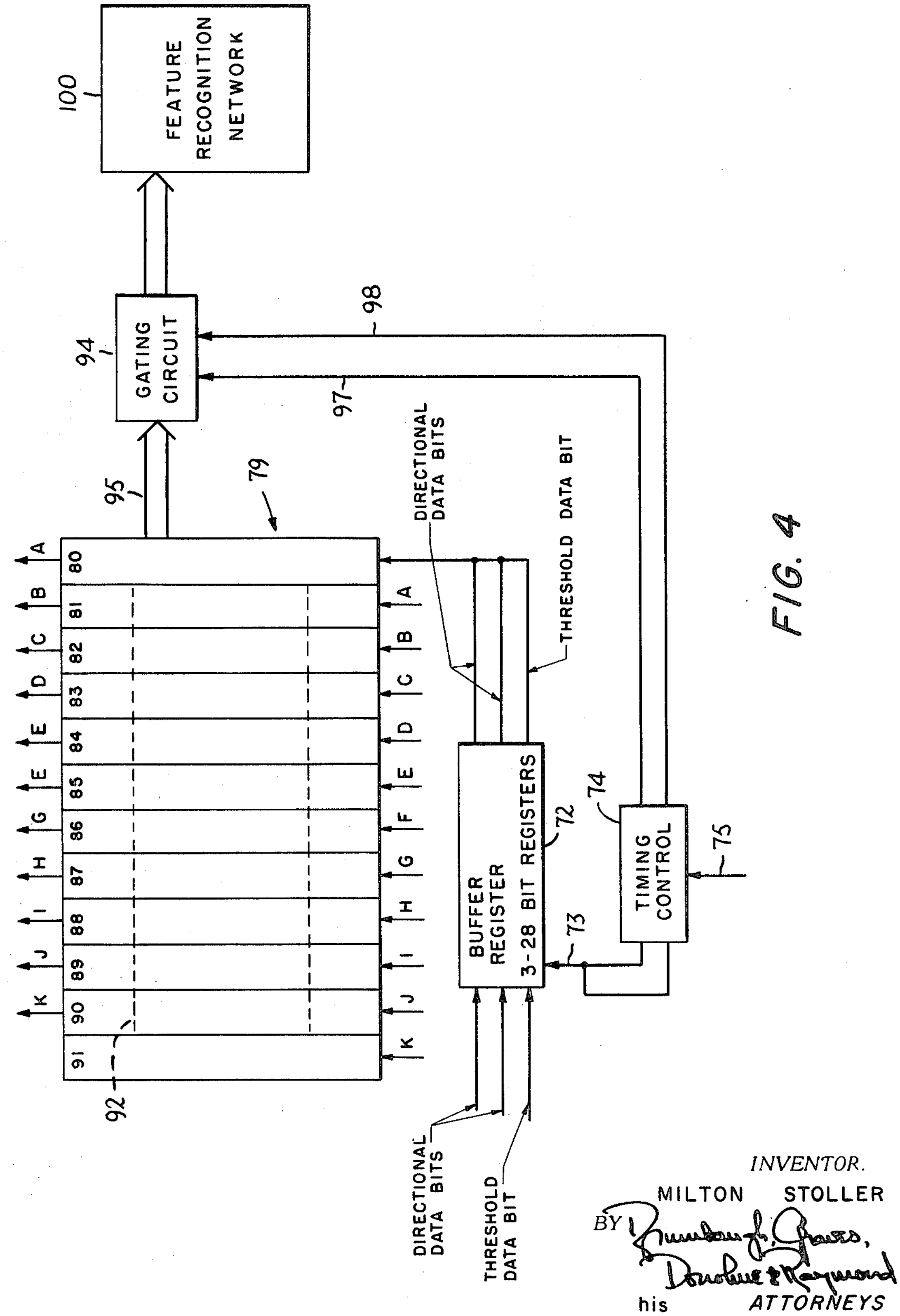
FIG. 4 is a schematic block diagram of a typical character shift register included within the system of FIG. 1.

Referring again to FIG. 1, the directional and threshold data bits, modified each microsecond, are transferred from the image enhancement network 30 to a character shift register 70. One embodiment of a character shift register 70 is shown in FIG. 4 and includes a buffer register 72 which serially stores the threshold and directional data bits. To this end, the register 72 includes three (3) 28 bit shift registers arranged in parallel to accommodate 56 (2 × 28) directional and 28 threshold data bits. In order to shift the threshold and directional data bits through the buffer register 72, two sets of shift pulses are alternately supplied to the register 72 along a conductor 73 from a timing control unit 74. The control unit is, in turn, controlled by the appropriate timing pulses supplied thereto along a conductor 74 from the computer interface network 22 (FIG. 1).

Figure 5:
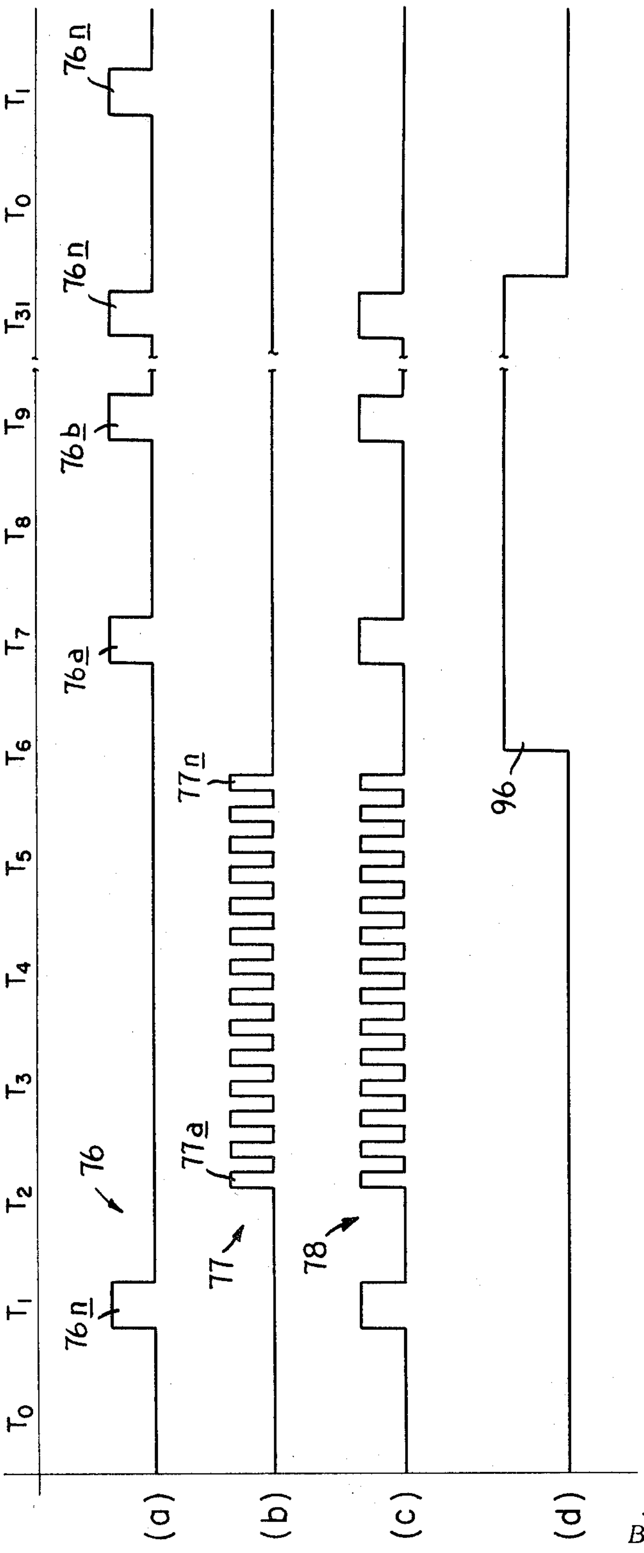
FIG. 5 illustrates graphically the occurrence of certain timing signals of use in understanding the operation of the character shift register shown in FIG. 4.

To better understand the operation of the character shift register 70, reference may be had to FIG. 5 wherein there are graphically shown typical timing pulses generated within the register. As shown in FIG. 5, the headings TO – $T_{31}$ represent increments of time spaced apart by intervals of one microsecond. Beginning at time period $T_7$, the timing control unit 74 generates a first series of signals 76 (FIG. 5(*a*)) consisting of fourteen 500 kilo Hz pulses 76*a* – 76*m*. These pulses 76*a* – 76*m* occur between time periods $T_7$ and $T_1$. Beginning at time period $T_2$, the control unit 74 generates a series of signals 77 (FIG. 5(*b*)) consisting of 145megaHz signals 77*a* – 77*n* occurring over a period of four microseconds. The signals are combined in the manner shown in FIG. 5(*c*) to provide a series of pulses 78 and supplied along the conductor 73 to the input terminal of the buffer register 72.

Referring again to FIG. 3, wherein a numerical printout of the brightness of a scanned image area is shown, it will be seen that twenty-eight (28) microseconds, rather than thirty-two (32) microseconds are required to fully sample the data bits recorded in each 5 × 3 × 32 matrix. This is true, as above noted, because the applicant's invention utilizes selective scanning of a 5 × 5 × 3 flip-flop matrix each microsecond with a central flip-flop trio (38*l* in FIG. 2) being used as the reference. Thus, as shown in FIG. 3, the selective scanning in each 5 × 3 × 32 matrix begins at column 46*c* and ends with column 46*m*. These columns contain the data corresponding to the scanning of the first and last reference flip-flop trios in each 5 × 3 × 32 matrix.

Thus, referring again to FIGS. 4 and 5, the directional and threshold data bits –supplied to the buffer register 72. During each 32 microseconds there will be stored in the register 72 all the directional and magnitudinal information corresponding to the scanning of – 5 × 32 flip-flop trio matrix, viz 84 (3 × 28) bits. Once stored, the three bits of information are transferred out of the register 72 within two microseconds (TO – $T_2$), 42 (3 × 14) bits are transferred out of the register during the next four microseconds ($T_2 – T_6$) and 39 (3 × 13) bits are transferred out of the register during the next 26 microseconds ($T_7$ – $T_{31}$). Thus, 42 directional and threshold data bits are transferred out of the register in 4 microseconds and 42 directional and threshold data bits are transferred out of the register in 28 microseconds (1/(14) × 500 KHz).

This data is then transferred along the appropriately labelled conductors to a main shift register 79. The shift register comprises 12 shift register columns (in plan) 80–91, each of which includes three (3) 28 bit shift registers arranged in superposed parallel relation. The directional and threshold data bits transferred from the register 72 to the register 79 are supplied separately to the first flip-flop in each of the three 28 bit registers composing the shift register column 80. Thereafter, the directional and threshold data bits are transferred through the registers 80–91 in the direction indicated by the arrows A-K, respectively, with the last or uppermost flip-flops in the three registers composing each register column being coupled to the first or lowest flip-flops in the three registers composing the next shift register column.

In each of the register columns 80–91, a total of 84 (3 × 28) different digital bits corresponding to directional and threshold data will be accumulated each 32 microseconds. Each column contains the directional and threshold data bits corresponding to the 5 × 3 × 32 matrix (FIGS. 2 and 3) scanned in the image enhancement network 30. As shown in FIG. 3, there are 60 rows in each scanned raster to provide a complete numerical printout of the scanned image area. Thus, the 12 register columns 80–91 accommodate the directional and threshold data bits corresponding to the 60 × 3 × 32 matrix shown in FIG. 3.

The applicant has discovered that it is unnecessary to scan all the flip-flops in the shift register 79 to develop sufficient information to accurately identify a particular character. Rather, what is required is the scanning of a central matrix 92 of flip-flops in the register. To this end, the flip-flops in the register columns 81–90 which store the threshold and directional data bits 4–19 during each 32 microseconds provide the necessary information.

Thus, within the main shift register 78, the set or "1" sides of the flip-flops arranged in a 10 × 16 ×3 central matrix 92 are brought out to a gating circuit 94 as indicated by the line 95. The gating circuit 94 is enabled between time periods $T_6$ and $T_{31}$ or between the second and fourteenth slow (500 kHz) pulses 76*a* and 76*m* by an enabling signal 96 (FIG. 5) also supplied by the timing control circuit 74 by way of a conductor 97. Also supplied from the timing control circuit 74 to the gating circuit along a conductor 98 is another gating signal which has a duration of 224 microseconds (7 × 32 microseconds). As above mentioned, the digital directional and threshold bits corresponding to all the digital information in a scanned image area are stored in the 12 registers 80–91. It will be noted that it would not be until the register 79 is filled with digital directional and threshold bits corresponding to the digital information in almost half a scanned image area will any character situated in such image area be detectable. Thus, to avoid the generation of spurious signals, the scanning by the gate circuit 94 takes place only after register columns 80–83 have accumulated digital directional and threshold bits corresponding to the digital information derived from a 20 × 3 × 32 matrix in the image enhancement network 30. Thereafter, as register columns 84–92 are sequentially filled up with the digital directional and threshold data bits, the gate circuit 94 scans the contents of flip-flop trios 4–19 in the register columns 81–90 every 32 microseconds for a period of 26 microseconds. Such scanning is initiated, as above described, after 45 (3 × 15) threshold and directional bits have been shifted into each of the register columns 81–90 and continues until the remaining 39 (3 × 13) threshold and directional bits have been shifted into each of the register columns 81–90.

In accordance with the present invention, the accumulations of threshold and directional bits in selected flip-flop trios in the matrix 92 are indicative of certain micro features by which characters can be identified.

In the illustrative embodiment, numerical characters are detected and to detect such characters, it is necessary to determine the presence or absence of such identifying microfeatures. According to the present invention, 23 microfeatures are used to both identify and distinguish between the characters 0–9.

Figure 6C:
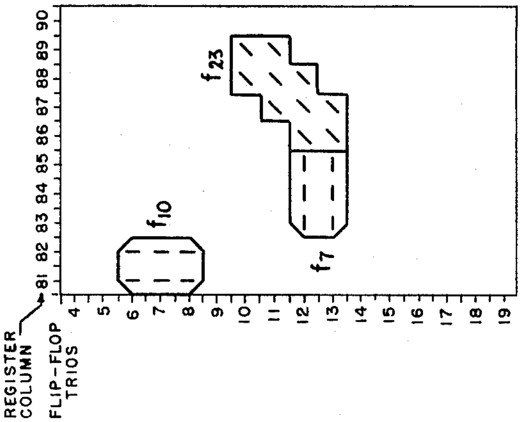
FIGS. 6A–6D illustrate the microfeatures to be detected in the character shift register shown in FIG. 4 and the combinations of such microfeatures forming characters.
Figure 6B:
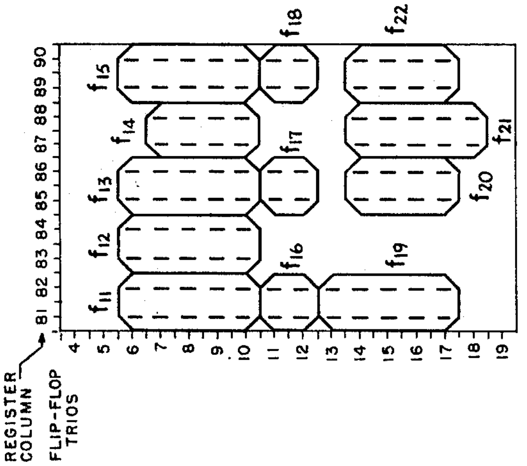
Figure 6A:
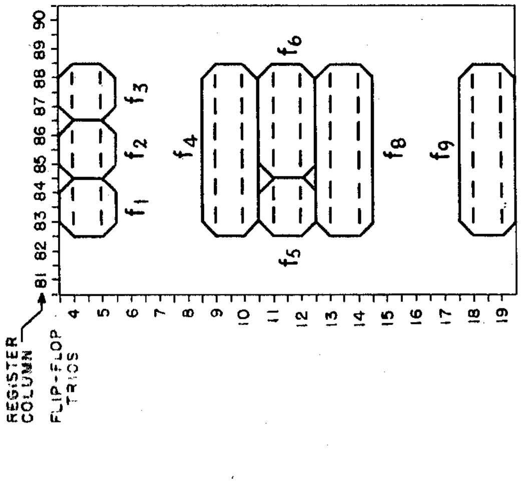

Referring now to FIGS. 6A, 6B and 6C, there are shown the microfeatures F1–F23 which represent the accumulations of certain directional and threshold bits in selected trios in the matrix 92. The microfeatures identified *f*1–*f*23 are set out in 10 × 16 matrices, each matrix comprising 10 columns identified by their corresponding register column numbers 81–90 and 16 rows identified by their corresponding flip-flop trio numbers. Each microfeature occupies at least four positions in the matrix and therefore corresponds to the data stored by at least four flip-flop trios in the matrix 92. For example, microfeature f1 corresponds to the accumulation of the sum signal $S_2$ (01) in the flip-flop trios 4 and 5 located in register column 83 and 84, together with a threshold signal in each of these trios. Microfeature *f*23 corresponds to the accumulation of the sum signal $S_3$ (10) in the flip-flop trios 10 that are located in register columns 88 and 89; the flip-flop trios 11 located in columns 87–89; the flip-flop trios 12 located in columns 86–88; and the flip-flop trios 13 located in columns 86, 87; together with a threshold signal in each of the aforementioned flip-flop trios. Specific combinations of such microfeatures, together with an absence of microfeatures, enable the applicant's system to identify with extreme accuracy the presence and identity of a particular character. It will be understood that the detection of a threshold signal in any particular flip-flop trio is a prerequisite to the detection of any particular microfeature.

From an analysis of FIGS. 6A–6C, it will be seen that it is only necessary to couple the output terminals of those flip-flop trios within the matrix 92 that contribute to the detection of microfeatures to the gating circuit 94. For example, it is unnecessary to couple the output terminal of the flip-flop trios 4 and 5 in register columns 81, 82, 89 and 90 to the gating circuit 94. When enabled, the gating circuit 94 transfers the signals generated by the flip-flops in each of the flip-flop trios of the register columns 81–90 to a feature recognition network 100.

Figure 6D:
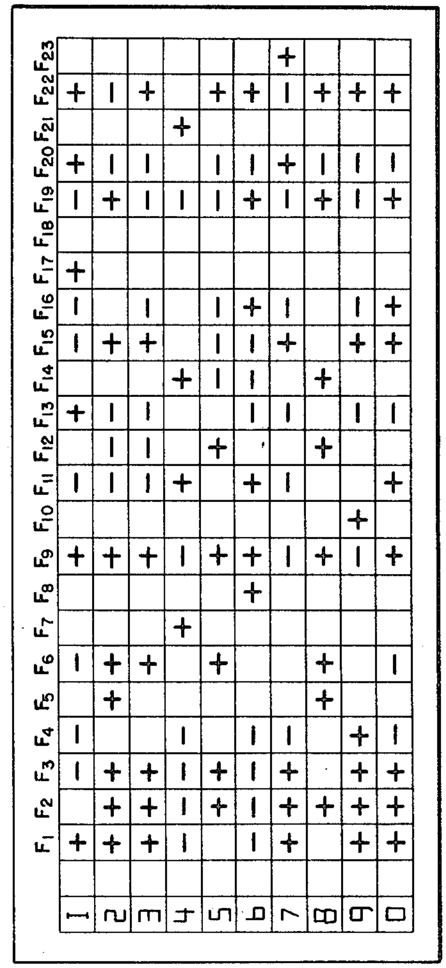

In the feature recognition network 100, which may simply comprise AND gates selectively connected to the gating circuit 94, the status of the flip-flop trios in the matrix 92 of the main shift register are decoded to determine the presence or absence of any or all the features *f*1–*f*23. In a particular embodiment of the invention that has been operated successfully, the detection of at least one of the components of a particular feature will be sufficient to generate an analogue signal indicative of the presence of such a feature. For example, in the case of feature f1, the detection of the sum signal $S_2$ (01) only in the flip-flop trio 4 located in register column 83 and no other, will suffice for the purpose of generating an analogue sum signal indicative of the detection of feature *f*1. However, the magnitude of the signal is weighted in accordance with the number of components detected. For example, the analogue sum signal would have twice the magnitude if the sum signal $S_2$ were also detected in the flip-flop trio 4 located in register column 84. Circuits for achieving weighted output signals are conventional and need not be described herein. Referring again to FIG. 1, the analogue signals representative of detected features are supplied to a feature combining network 102 wherein the individual features are sampled to generate a character representative signal. In the network 102, the detected or positive features, as well as undetected or negative features, are sampled to provide a weighted output signal having a magnitude that is proportional to the number of positive and negative features that are detected. The tabular chart of FIG. 6D illustrates the positive and negative features which make up the characters 0–9.

Figure 7:
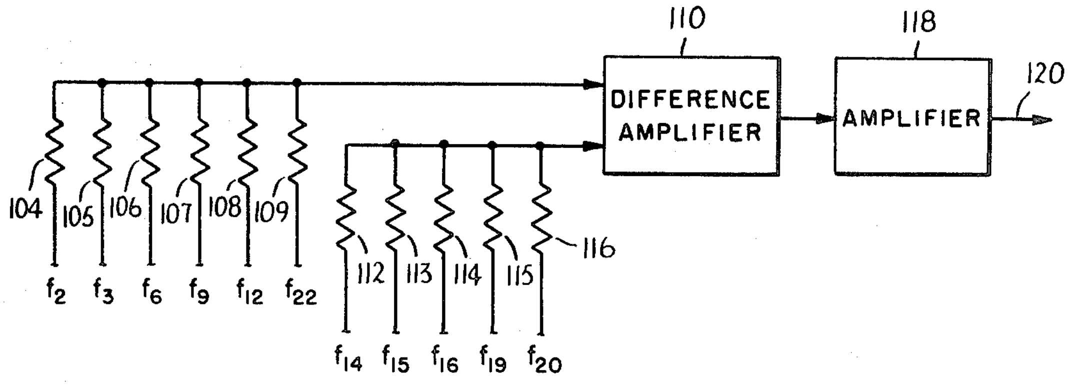
FIG. 7 illustrates schematically a typical circuit included within the feature combining network of the FIG. 1 system for detecting the character 5.

Referring to FIG. 7, there is shown in schematic form a typical character recognition circuit within the network 102 for detecting the character 5. As shown in FIG. 6D, the character 5 consists of the positive features *f*2, *f*3, *f*6, *f*9, *f*12 and *f*22 and the negative features *f*14, *f*15, *f*16, *f*19, and *f*20. The outline of the character 5 may be sketched by composing the features *f*2, *f*3, *f*6 and *f*9 of FIG. 6A and the features *f*12 and *f*22 from FIG. 6B. In the character recognition circuit for detecting the character 5, as shown in FIG. 7, the analogue signals supplied from the feature recognition network 100, and corresponding to the features *f*2, *f*3, *f*6, *f*9, *f*12 and *f*22 are conducted to the input terminals of six resistors 104, 105, 106, 107, 108 and 109, as indicated. The resistors 104–109 are arranged parallel and coupled together to one input terminal of a difference amplifier 110. The analogue signal corresponding to the detection of the negative features *f*14, *f*15, *f*19 and *f*20 are supplied from the recognition network 100 to the input terminals of five resistors 112, 113, 114, 115 and 116, as indicated. The resistors 112-116 are also arranged in parallel and coupled together to the other input terminal of the difference amplifier 110.

The analogue signals corresponding to the positive features *f*2, *f*3, *f*6, *f*9, *f*12 and *f*22 are added together by the resistors 104–109 and the analogue signals corresponding to the negative features *f*14, *f*15, *f*16, *f*19 and *f*20 are added together by the resistors 112–116, respectively. In the amplifier 110, the signal representing the sum of the negative features is subtracted from the signal representing the sum of the positive features to produce a difference signal having a magnitude which is proportional to the number of positive and negative features that are detected. A maximum difference signal is produced when all the positive features *f*2, *f*3, *f*6, *f*9, *f*12 and *f*22 are detected and none of the negative features *f*14, *f*15, *f*16, *f*19 and *f*20 are detected. Conversely, a minimum difference signal is produced when none of the positive features are detected and all the negative features are detected. The difference signal produced by the amplifier 110 is supplied to an amplifier 118 which amplifies the difference signal and connects the amplified difference signal over a conductor 120 included within a cable 122 (FIG. 1) to a best match circuit 124.

There are nine other circuits of the type illustrated in FIG. 7 included within the feature combining network 102 and these circuits produce difference signals representing the presence or absence of the character signals 0–4 and 6–9. The outputs of these circuits are also coupled to the best match circuit 124 via separate conductors included within the cable 122.

In the best match circuit 124, the 10 amplified difference signals produced by the network 102 are sampled periodically, (e.g., every 32 microseconds) to determine whether any or all the input difference signals have magnitudes indicative of the detection of particular characters. Where more than one character representative signal is detected or not any character representative signal is detected, an appropriate "error" or the like signal is generated. When a particular character is detected, an appropriate character signal is generated. The best match circuit may be conventional and comprise for example, 10 (0–9) AND gates to which the character representative signals are selectively supplied and to which a constant frequency timing signal having a predetermined constant magnitude or sloping magnitude is supplied. When an input character signal has an appropriately high amplitude, viz., at least equal to or greater than the magnitude of the timing signal, the appropriate AND gate is enabled and transmits the timing pulse. Such transmitted timing pulse constitutes a character signal. There may be, for example, 12 conductors for supplying as output signals the signals generated by circuit 124. Ten conductors accommodate the ten different character or timing signals. One conductor conducts a signal indicating that two or more characters have been detected and one conductor conducts the signal indicating that no character signal has been detected.

From the circuit 124, the signals are coupled by their respective conductors contained within a cable 126 to a character encoder circuit 128. In the encoder, the signals are encoded into a form suitable for data processing. Specifically, in response to the timing signals corresponding to the character 0–9, and in response to the signals representing error conditions, the encoder 128 develops conventional 5 bit binary coded signals representative of such characters and error signals. These binary coded signals are in turn coupled to the computer interface network 22 via a cable 130 which, in turn, transfers the data to the digital computer 20.

The computer 20 is programmed to receive the binary coded signals representative of characters and transfers such signals to a storage unit 132, which may be, for example, a magnetic tape unit, wherein the signals are recorded. With respect to error signals, the computer may be programmed to initiate scanning of the same page area by the image dissector 10 or merely identify the particular page or document having non-recognizable characters. When such a page or document has been identified, the computer is programmed to initiate the appropriate sub-routing to store the identity of the page or document and count the number of detected errors.

Although the invention has been described herein with reference to a specific embodiment, many modifications and variations therein will be readily apparent to those skilled in the art. For example, because applicant utilizes an image dissector tube as the scanning device in his system, the "flood lighting" that is required by the tube 10 will enable the foregoing system to be modified to include a microfilm camera adjacent the tube. Such camera can then microfilm documents as they are being read. The information which is then read by applicant's system can be used for (1) annotation of the film for quick retrieval, (2) generation of a master file on magnetic tape, or (3) generation of a master file at one end of the microfilm reel.

Also, instead of scanning pages and documents, microfilm may be read and interpreted by projecting the microfilm image directly onto the face of the image dissector tube 10. Thus, applicant's system is capable of reading paper, making a microfilm of the paper being read, and reading the microfilm itself. All such modifications and variations are intended to be included within the scope of the present invention as defined by the following claims.

I claim:

1. Optical character recognition apparatus comprising means for scanning a storage medium having recorded thereon character representative symbols to develop analog information signals representative of the brightness of the storage medium, converter means for converting the analog information signals into digital data signals representative of a range of the segmental brightness of the scanned storage medium, enhancement network means including means for accumulating the digital data signals into predetermined arrays and means for periodically sampling selected directional sets of digital data signals within said predetermined arrays to develop directional digital data bits and threshold digital data bits, each of the directional digital data bits representing the set of said directional sets having the least brightness and threshold digital data bits characterizing said directional digital data bits as black or white, register means for accumulating the directional and threshold digital data bits in a sequential manner in arrays to provide arrays of such directional and threshold digital data bits representative of entire characters, detection means for detecting the presence and absence of such directional and threshold digital data bits in said arrays and means for combining the detected directional and threshold digital data bits to provide a character representative signal.

2. Optical character recognition apparatus according to claim 1 wherein the enhancement network means comprises register means for sequentially accumulating the digital data signals into sequential arrays corresponding to the scanning of a selected area on the storage medium by the scanning means and means for periodically sampling selected directional sets of the digital data signals accumulated in the arrays for developing each sampling directional digital data bits representative of the set of said directional sets having the least brightness and threshold digital data bits characterizing said directional digital data bits as black or white, said directional and threshold digital data bits representative of the character information contained in each of the arrays.

3. Optical character recognition apparatus according to claim 2 wherein the register means comprises a plurality of storage means for sequentially accumulating the digital data signals into arrays corresponding to the scanning of a selected number of scanning lines on the storage medium by the scanning means and the sampling means comprises means for sampling periodically the digital data signals accumulated in selected storage means extending in a plurality of directions outwardly from a common reference storage means for developing each sampling directional digital data bits representative of the storage means storing the digital data signals representative of the least brightness and threshold digital data bits characterizing said directional digital data bits as black or white.

4. Optical character recognition apparatus according to claim 3 wherein the sampling means comprises means for separately adding the digital data signals stored in the storage means extending in different directions to provide analog sum signals representative of the magnitudes of said digital data signals and comparator means responsive to the sum signals, the comparator means comprising means for generating directional digital data signals representative of the sum signals having the smallest magnitudes and means for detecting sum signals having amplitudes less than a predetermined amplitude to produce threshold digital data signals.

5. Optical character recognition apparatus according to claim 1 wherein the register means comprises first means for sequentially accumulating the directional and threshold digital data bits representative of the character information contained in each array sampled by the sampling means and second means coupled to the first means for accumulating the directional and threshold digital data bits representative of the character information contained in a plurality of sampled arrays to thereby provide directional and threshold digital data bits representative of entire characters.

6. Optical character recognition apparatus according to claim 5 further comprising means for transferring the directional and threshold data bits accumulated in the first means to the second means at a variable frequency.

7. Optical character recognition apparatus according to claim 6 wherein the transfer means comprises a source of timing signals for supplying alternate sets of timing signals to said first means to effect the sequential transfer of the directional and threshold data bits from the first means to the second means at a fast frequency and at a slow frequency.

8. Optical character recognition apparatus according to claim 7 wherein the number of timing signals occurring at the fast frequency corresponds to one-half the number of threshold and directional digital data bits accumulated by the first means and the number of timing signals occurring at the slow frequency corresponds to the other one-half the number of accumulated threshold and directional digital data bits.

9. Optical character recognition apparatus according to claim 8 wherein the second means comprises a plurality of shift registers coupled together in serial fashion, each register designed to accumulate the directional and threshold digital data bits accumulated by the first means, whereby the plurality of shift registers accumulate directional and threshold digital data bits representative of entire characters.

10. Optical character recognition apparatus according to claim 9 wherein the detection means comprises means for scanning a predetermined array of stages in the plurality of shift registers to determine the presence or absence of threshold and directional data bits in such stages by which the microfeatures of characters can be identified.

11. Optical character recognition apparatus according to claim 10 wherein the source of timing signals includes means for generating an enabling signal and supplying such signals to the detection means to enable the detection means to detect threshold and directional data bits in the stages of the shift registers during the occurrence of the slow frequency timing signals.

12. Optical character recognition apparatus according to claim 11 wherein the detection means further comprises feature recognition network means responsive to the detected threshold and directional data bits for generating signals representative of microfeatures by which characters can be identified.

13. Optical character recognition apparatus according to claim 12 wherein the combining means comprises means responsive to the signals representative of microfeatures for combining such signals to produce character representative signals.

14. Optical character recognition apparatus according to claim 12 wherein the combining means comprises means responsive to the signals representative of the positive and negative microfeatures by which a character can be identified for combining such signals to produce character representative signals.

15. Optical character recognition apparatus according to claim 14 further comprising matching circuit means operatively coupled to the combining means for precluding the simultaneous production of more than one character representative signal.

16. Optical character recognition apparatus according to claim 14 further comprising matching circuit means operatively coupled to the combining means for transmitting character representative signals having amplitudes greater than a predetermined amplitude.

17. Optical character recognition apparatus according to claim 16 further comprising encoder circuit means responsive to the transmitted character representative signals for encoding such signals into binary coded signals representative of such characters.

18. Optical character recognition apparatus according to claim 1 wherein the scanning means comprises an image dissector for dissecting the photoelectric image of the storage medium in a line-by-line scanning pattern to develop analog information signals having line-by-line components.

19. Optical character recognition apparatus according to claim 18 further comprising control means coupled to the image dissector for controlling the frequency of the scanning by the dissector and the area of the photoelectric image dissected by the image dissector.

* * * * *

PO-1050
(5/69)

UNITED STATES PATENT OFFICE
CERTIFICATE OF CORRECTION

Patent No. 3,723,970 Dated March 27, 1973

Inventor(s) Milton Stoller

It is certified that error appears in the above-identified patent and that said Letters Patent are hereby corrected as shown below:

Column 1, line 14, "date" should be -- data --;

Column 4, line 67, "48a-48" should be -- 48a-48e --;
Column 5, line 19, "40j-40" should be --40j-40n --;
Column 5, line 20, "46j-46x" should be -- 46j-46n. The flip-flop --;
Column 5, line 21, "42j-42" should be -- 42j-42n --;
Column 5, line 25, "42j-42" should be -- 42j-42n --;
Column 5, line 32, "(110=b)" should be -- (110=6) --;
Column 5, line 42, "48g" should be -- 48b --;
Column 5, line 52, "48h" should be -- 48b --;
Column 5, line 55, "40j-40" should be -- 40j-40n --;
Column 7, line 38, "74" should be -- 75 --;
Column 8, line 6, "-supplied" should be -- are supplied --;
Column 8, line 10, "-5" should be -- a 5 --;
Column 10, line 68, "f15, f19" should be -- f15, f16, f19 --;
Column 12, line 23, "sub-routing" should be -- sub-routine --.

Signed and sealed this 25th day of December 1973.

(SEAL)
Attest:

EDWARD M. FLETCHER, JR.
Attesting Officer

RENE D. TEGTMEYER
Acting Commissioner of Patents